United States Patent
Ball et al.

(10) Patent No.: US 7,524,780 B2
(45) Date of Patent: Apr. 28, 2009

(54) LOW LOSS OPTICAL FIBER AND METHOD FOR MAKING SAME

(75) Inventors: Laura J. Ball, Corning, NY (US); Bruno P. M. Baney, Seyssins (FR); Dana C. Bookbinder, Corning, NY (US); Keith L. House, Corning, NY (US); Rostislav R. Khrapko, Corning, NY (US); Lisa A. Moore, Corning, NY (US); Susan L. Schiefelbein, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 794 days.

(21) Appl. No.: 11/046,435

(22) Filed: Jan. 28, 2005

(65) Prior Publication Data

US 2005/0201699 A1    Sep. 15, 2005

Related U.S. Application Data

(63) Continuation of application No. 10/231,865, filed on Aug. 28, 2002, now abandoned.

(51) Int. Cl.
C03C 13/04    (2006.01)
C03C 3/076    (2006.01)
C03C 3/06    (2006.01)

(52) U.S. Cl. .............................. 501/37; 501/54; 501/55; 501/56; 385/123; 385/141; 385/142; 385/144

(58) Field of Classification Search .................. 501/37, 501/55, 56, 54; 385/123, 141, 142, 144
See application file for complete search history.

(56) References Cited

U.S. PATENT DOCUMENTS

| | | | |
|---|---|---|---|
| 3,853,673 A | 12/1974 | Levene et al. | 161/1 |
| 3,938,974 A | 2/1976 | Macedo et al. | 65/3 R |
| 3,957,342 A * | 5/1976 | Newns et al. | 385/141 |
| 3,971,645 A | 7/1976 | Bachmann et al. | 65/3 A |
| 4,097,258 A * | 6/1978 | Horikawa et al. | 65/31 |
| 4,099,834 A * | 7/1978 | Faulstich et al. | 385/141 |
| 4,183,620 A * | 1/1980 | Macedo et al. | 385/141 |
| 4,225,330 A | 9/1980 | Kakuzen et al. | 65/18 |
| 4,236,930 A * | 12/1980 | Macedo et al. | 501/65 |
| 4,277,270 A | 7/1981 | Krohn | 65/3 A |
| 4,310,341 A | 1/1982 | Barns et al. | 65/3.12 |
| 4,336,048 A | 6/1982 | Van der Steen et al. | 65/18.4 |
| 4,336,049 A | 6/1982 | Takahashi et al. | 65/3.12 |
| 4,388,098 A | 6/1983 | Takahashi et al. | 65/157 |
| 4,418,985 A | 12/1983 | Kasori et al. | 350/96.34 |
| 4,419,115 A | 12/1983 | Johnson, Jr. et al. | 65/3.12 |
| 4,768,859 A | 9/1988 | Kasori et al. | 350/96.34 |
| 4,902,426 A * | 2/1990 | Macedo et al. | 65/31 |
| 4,925,472 A | 5/1990 | Di Vita | 65/2 |
| 4,988,162 A | 1/1991 | Hayami | 350/96.25 |
| 5,106,402 A | 4/1992 | Geittner et al. | 65/3.12 |
| 5,146,534 A | 9/1992 | Lines | 385/142 |
| 5,240,488 A | 8/1993 | Chandross et al. | 65/3.11 |
| 5,306,322 A | 4/1994 | Ishikawa et al. | 65/3.12 |
| 6,128,430 A * | 10/2000 | Chu et al. | 385/142 |
| 6,131,415 A | 10/2000 | Chang et al. | 65/391 |
| 6,153,546 A | 11/2000 | Saitoh et al. | 501/37 |
| 6,410,467 B1 * | 6/2002 | Dickinson et al. | 501/37 |
| 6,599,852 B2 * | 7/2003 | Kondo et al. | 501/42 |
| 6,632,759 B2 * | 10/2003 | Borelli et al. | 501/66 |

FOREIGN PATENT DOCUMENTS

| | | |
|---|---|---|
| EP | 0 321 182 | 6/1989 |
| EP | 0 673 895 A2 | 9/1995 |
| EP | 0 793 122 A2 | 9/1997 |
| EP | 0 902 307 | 3/1999 |
| EP | 0 915 065 A1 | 5/1999 |
| EP | 1 038 845 | 10/2003 |
| GB | 1 289 673 | 9/1972 |
| GB | 1598760 | 9/1981 |
| GB | 2 126 820 A | 3/1984 |
| JP | 62-80606 | 4/1987 |
| JP | 62-283845 | 12/1987 |
| WO | WO 00/64824 | 11/2000 |

OTHER PUBLICATIONS

Patent Abstracts of Japan 63-195147, Dec. 8, 1988, Nippon Telegra &Teleph Corp, & Patent Disclosure Bulletin English Translation.
Patent Disclosure Bulletin, English Translation Japanese Patent 63-40744 (1998), Feb. 22, 1998.
Palais, Joseph C., "Fiber Optic Communications", 1984, Prentice-Hall, Inc., New Jersey, p. 96-100, Optic Fiber Waveguides.
Lines, "Optical losses from compositional fluctuations in three-component glasses", Journal of Non-Crystalline Solids 195 (1996) 249-260.
Lines et al., "Calcium Aluminate Glasses As Potential Ultralow-Loss Optical Materials At 1.5-1.9 μm", Journal of Non-Crystalline Solids 107 (1989) 251-260.
Saito et al., "A new method of developing ultralow-loss glasses", Journal Applied Physics, vol. 81, No. 11, Jun. 1997, p. 7129-7134.
Lines, "Can the minimum attenuation of fused silica be significantly reduced by small compositional variations? I. Alkali metal dopants", Journal of Non-Crystalline Solids 171(1994) 209-218.
Lines, "Can the minimum attenuation of fused silica be significantly reduced by small compositional variations? II. Combined fluorine and alkali metal dopants", Journal of Non-Crystalline Solids 171(1994) 219-227.
"Compound-Glass Waveguides Fabricated By A Metal Evaporation Technique", Nagel et al., Journal of The American Ceramic Society, vol. 59, No. 1-2, p. 47-49, Jan.-Feb. 1976.

* cited by examiner

Primary Examiner—Karl E Group
Assistant Examiner—Elizabeth A Bolden
(74) Attorney, Agent, or Firm—Kevin M. Able (57) ABSTRACT

A method of forming an alkali metal oxide-doped optical fiber by diffusing an alkali metal into a surface of a glass article is disclosed. The silica glass article may be in the form of a tube or a rod, or a collection of tubes or rods. The silica glass article containing the alkali metal, and impurities that may have been unintentionally diffused into the glass article, is etched to a depth sufficient to remove the impurities. The silica glass article may be further processed to form a complete optical fiber preform. The preform, when drawn into an optical fiber, exhibits a low attenuation.

11 Claims, 5 Drawing Sheets

LOW LOSS OPTICAL FIBER AND METHOD FOR MAKING SAME

This is a continuation of U.S. patent application Ser. No. 10/231,865 filed on Aug. 28, 2002, now abandoned, which is hereby incorporated herein by reference in its entirety, and the benefit of priority is claimed under 35 U.S.C. 120.

BACKGROUND OF THE INVENTION

1. Field of the Invention

The present invention relates generally to a method for manufacturing a low loss optical fiber, and more particularly, methods for producing an optical fiber doped with an alkali metal oxide.

2. Technical Background

Attenuation is a principal limiting attribute of optical fibers. Optical fiber loss, for example, plays an important role in setting the limiting distance between optical fiber amplifiers. This is particularly important in long distance and ultra-long distance networks such as, for example, undersea applications, where such amplifiers represent a significant system cost, as well as a major factor in system reliability. Consequently there is a tremendous amount of commercial interest in reducing attenuation to the lowest possible level.

For silica-based optical fibers used in long distance telecommunication transmission networks, attenuation losses have been reduced to the point where most of the remaining attenuation is due to intrinsic scattering within the glass material. It is generally accepted that intrinsic scattering is a combination of losses associated with density and dopant concentration fluctuations. Density fluctuations are closely proportional to the glass transition temperature, $T_g$, defined as the temperature at which the melt viscosity is $10^{13}$ poise, and may result in both large and small-angle scattering losses.

One means of lowering the $T_g$, and therefore the attenuation, is to add a modifier to the core glass. Such modifiers, if chosen appropriately, are capable of significantly reducing scattering losses in the fiber core, and therefore the attenuation of the fiber. Alkali metal oxides serve as efficient modifiers—a concentration of approximately 0.5 mole percent of an alkali metal oxide can reduce the attenuation of silica glass by as much as 25%.

The most common, commercially available optical fibers are $SiO_2$-based, and the theoretical lower limit for the attenuation in such fibers is generally accepted to be about 0.15 dB/km. It is known in the art that some non-$SiO_2$ glasses, such as high-alkali alumino-silicate and fluoride glasses, are capable of achieving losses lower than $SiO_2$-based fiber, however these approaches have not yet been commercially realized in long-length transmission fiber.

Silica-based glasses containing an alkali metal oxide dopant, alone or in combination with other compounds, such as, for example, CaO, $Al_2O_3$ or F, have been proposed as core materials for optical fibers having intrinsic scattering losses lower than that of pure vitreous $SiO_2$. However, attempts to manufacture such fibers have resulted in attenuation levels much higher than the theoretical lower limit. In the case of the multi-dopant glasses, increased dopant concentration fluctuations and crystallization have proven difficult to overcome. For both single and multi-dopant glasses, high levels of contaminants, such as, for example, transition metals and $^-OH$, have made it difficult to achieve the desired low attenuation. Often these contaminants are unintentionally introduced during the doping process.

Conventional soot-to-glass fiber making processes, such as outside vapor deposition (OVD) and vapor axial deposition (VAD), are not well suited to alkali metal oxide doping. One reason for this unsuitability is the unavailability of simple, easy-to-deploy high vapor pressure alkali metal source compounds. In addition, the soot preforms that result from these processes generally contain $H_2O$, a combustion by-product generated during the soot laydown process. This $H_2O$ can disassociate during further processing of the soot preform to form $^-OH$. $^-OH$ can have a deleterious effect on fiber attenuation, particularly when present in the core of the fiber. Typically, this $^-OH$ is removed by flowing chlorine through the preform at an elevated temperature. Unfortunately, this drying step would likewise remove any alkali metal oxide that would be deposited in an OVD or VAD process by forming an alkali chloride. Moreover, any alkali chloride that remained in the preform after the chlorine drying step would form alkali chloride crystals upon cooling. Such crystals cause the glass to become opaque, making it unsuitable for the transmission of light. Further, the alkali metals also increase the crystallization rate of the silica itself such that the alkali metal oxide-doped silica soot that would be deposited in an OVD or VAD process would tend also to crystallize before it can be sintered into dense, defect-free glass.

One technique for incorporating an alkali metal oxide into silica glass is by diffusing an alkali metal directly into consolidated glass. However, efforts to diffuse alkali metals into silica glass have suffered from the simultaneous diffusion of impurities, including transition metals and water, resulting in losses well above the theoretical minimum. It would be desirable to develop a method of doping a silica glass optical fiber precursor with an alkali metal such that a fiber drawn therefrom would have a low optical loss.

SUMMARY OF THE INVENTION

The present invention entails the manufacture of an optical fiber doped with an appropriate material of sufficient purity that low optical loss can be achieved. By low loss we mean an optical attenuation preferably less than about 0.18 dB/km at a wavelength of 1550 nm, more preferably less than about 0.17 dB/km at a wavelength of 1550 nm, and most preferably less than about 0.16 dB/km at a wavelength of 1550 nm. More specifically, the present invention relates to a method for diffusing an alkali metal through a surface of a silica glass article, hereinafter referred to as the diffusion surface, and etching the diffusion surface to a depth sufficient to remove impurities that may have been unintentionally introduced into the glass during the diffusion process. By diffusion surface we mean the surface of the glass article through which diffusion of the alkali metal has occurred. The silica glass article may be in the form of a tube, a rod, or a collection of tubes or rods, or other glass articles suitable for use as an optical fiber precursor. Alkali metals exhibit a high diffusion rate in silica glass when compared with typical contaminants, such as, for example, transition metals that may be present in minute quantities in the alkali metal source compound or in the environment surrounding the silica glass. Whereas the alkali metal exhibits high diffusivity and is therefore able to move deeply into the silica glass, transition metal diffusivities are significantly lower, and the transition metal impurities are consequently able to diffuse only to shallow depths from the diffusion surface of the glass. We have discovered that this difference in relative diffusion depths between the desired alkali metal dopant and the undesirable impurities advantageously allows these impurities to be removed by conventional etching techniques subsequent to the diffusion process, thereby effectively purifying the alkali metal dopant, with minimal impact on the concentration of alkali metal oxide in the glass.

Preferably the silica glass article is essentially free of chlorine and water. Alkali metals bond strongly with chlorine, either within the silica glass, or outside of the silica glass, to form an alkali metal chloride. Such alkali metal chloride, if formed outside the silica glass, will inhibit the diffusion of the alkali metal into the glass article. If formed within the silica glass article, alkali metal chloride crystals would render the glass opaque and therefore undesirable for the transmission of light.

The alkali metal is selected from the group consisting of K, Na, Li, Cs and Rb. When diffused into a silica glass network, the alkali metal bonds with oxygen within the glass network to create an alkali metal oxide of the form $X_2O$, where X is a member of the preceding group. Using current manufacturing processes, we have found that doping with K or Na produces superior optical loss results over Li, Cs, or Rb and consequently the preferred alkali metals are K and Na. However, this may change in the future as manufacturing processes continue to evolve. For the reasons stated earlier, it is preferred that the alkali metal source compound does not contain chlorine, but otherwise any alkali metal containing source compound is suitable.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention. Where appropriate, identical features have been identically numbered.

DETAILED DESCRIPTION OF THE INVENTION

The present invention relates to a process of manufacturing a low loss optical fiber. More specifically, the invention relates to preparing an optical fiber precursor by diffusing an alkali metal into a silica glass article and, subsequent to the diffusion process, etching the silica glass article to remove unwanted contaminants that may have been unintentionally diffused into the glass. By optical fiber precursor we mean a complete optical fiber preform, or a precursor to a complete optical fiber preform such as, for example, a core cane or a deposition tube. By core cane we mean a consolidated glass precursor to an optical fiber preform that is not a complete optical fiber preform but which includes at least a portion of the core. By complete optical fiber preform we mean a consolidated glass article ready for drawing into an optical fiber.

Figure 1:
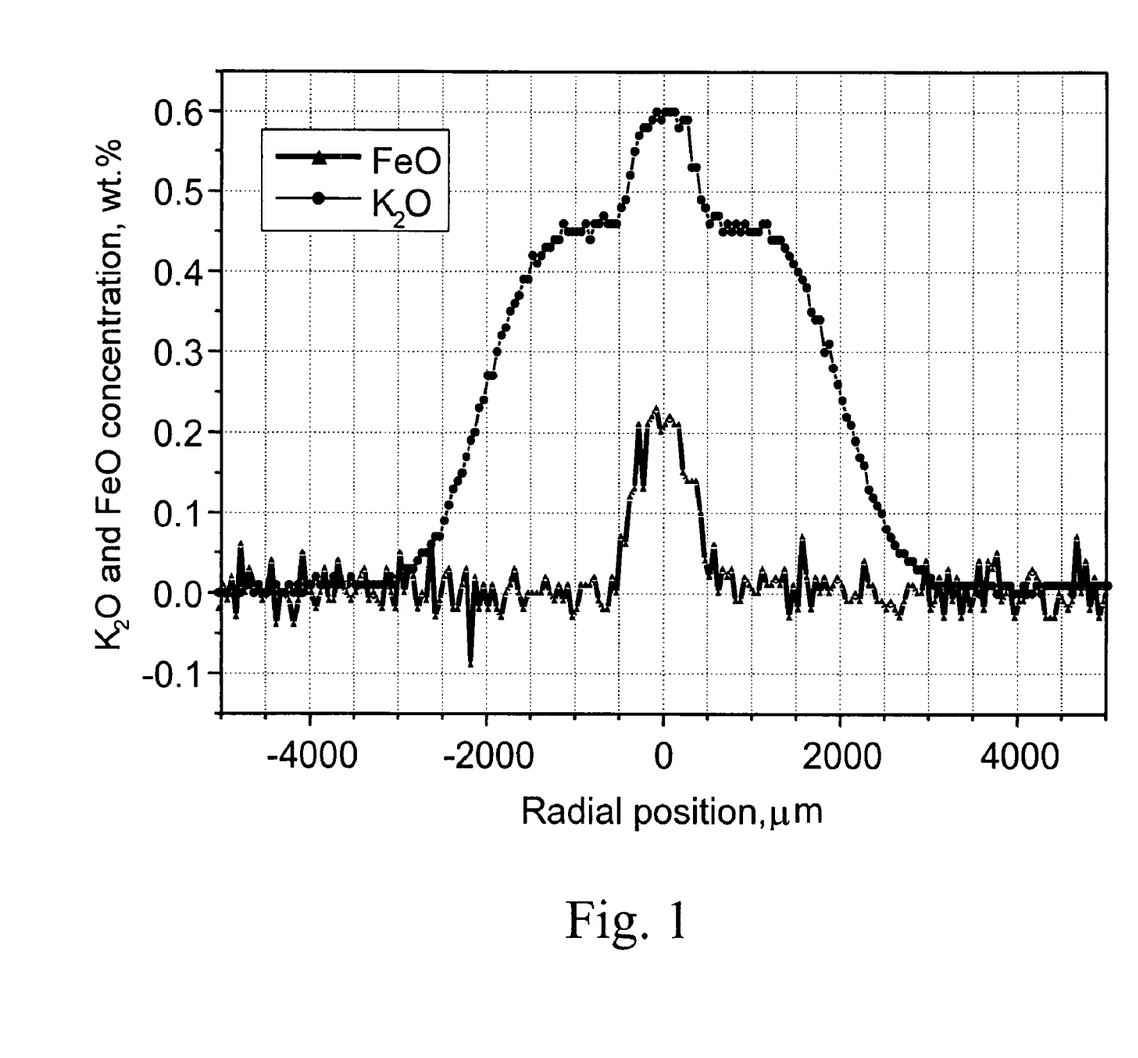
FIG. 1 depicts the diffusion depths for K and Fe, as determined by measuring the concentrations of $K_2O$ and FeO, and shows significantly greater diffusion of K than for Fe.

Silica glass doped with an alkali metal oxide has been shown capable of producing losses below the theoretical lower limit for pure silica glass. By "doped" or "doping", or equivalent, we mean the intentional addition of a material or materials to a glass to achieve desired characteristics (as indicated herein) in such a glass. One means of producing a low loss optical fiber is by diffusing an alkali metal into a suitable silica glass article that is a precursor to an optical fiber. Conventional diffusion techniques may result in the diffusion of unwanted contaminants, such as, for example, transition metal ions. However, for a given set of processing conditions, such as time and temperature, for example, the diffusion depth of an alkali metal dopant differs greatly from such contaminants, with the alkali metal exhibiting a diffusion depth in silica glass much greater than, for example, a transition metal contaminant. This is illustrated graphically in FIG. 1. In this example, both potassium and the transition metal iron were diffused through the interior surface of a silica glass tube in a method according to the present invention. The tube was then collapsed without etching. Inside the glass the alkali metal and the transition metal bond with available oxygen to form $K_2O$ and FeO within the silica glass network. The depth of diffusion for both the alkali metal and the transition metal was determined by measuring the concentration of $K_2O$ and FeO as a function of radial position using an electron microprobe. Note that after collapse of the silica glass tube the layer of glass into which the alkali metal and the transition metal have been diffused, and which layer extends from the interior surface of the silica glass tube outward, becomes the central region of the silica glass rod resulting from the collapse. FIG. 1 shows the relatively shallow diffusion depth of FeO, depicted by a region about 500 microns in radius concentric with the centerline of the collapsed silica glass tube, compared to a region approximately 3000 microns in radius concentric with the centerline of the collapsed silica glass tube for $K_2O$. The shallow layer of FeO contaminant within the glass tube, as indicated by the small diameter region of FeO in FIG. 1, is preferably removed prior to collapse of the silica glass tube to achieve a low loss optical fiber. The process for manufacturing a low loss optical fiber, according to the present invention, involves diffusion doping a consolidated glass optical fiber precursor with an alkali metal, and then etching the diffusion surface with a suitable etchant to remove unwanted diffused contaminants.

Figure 2:
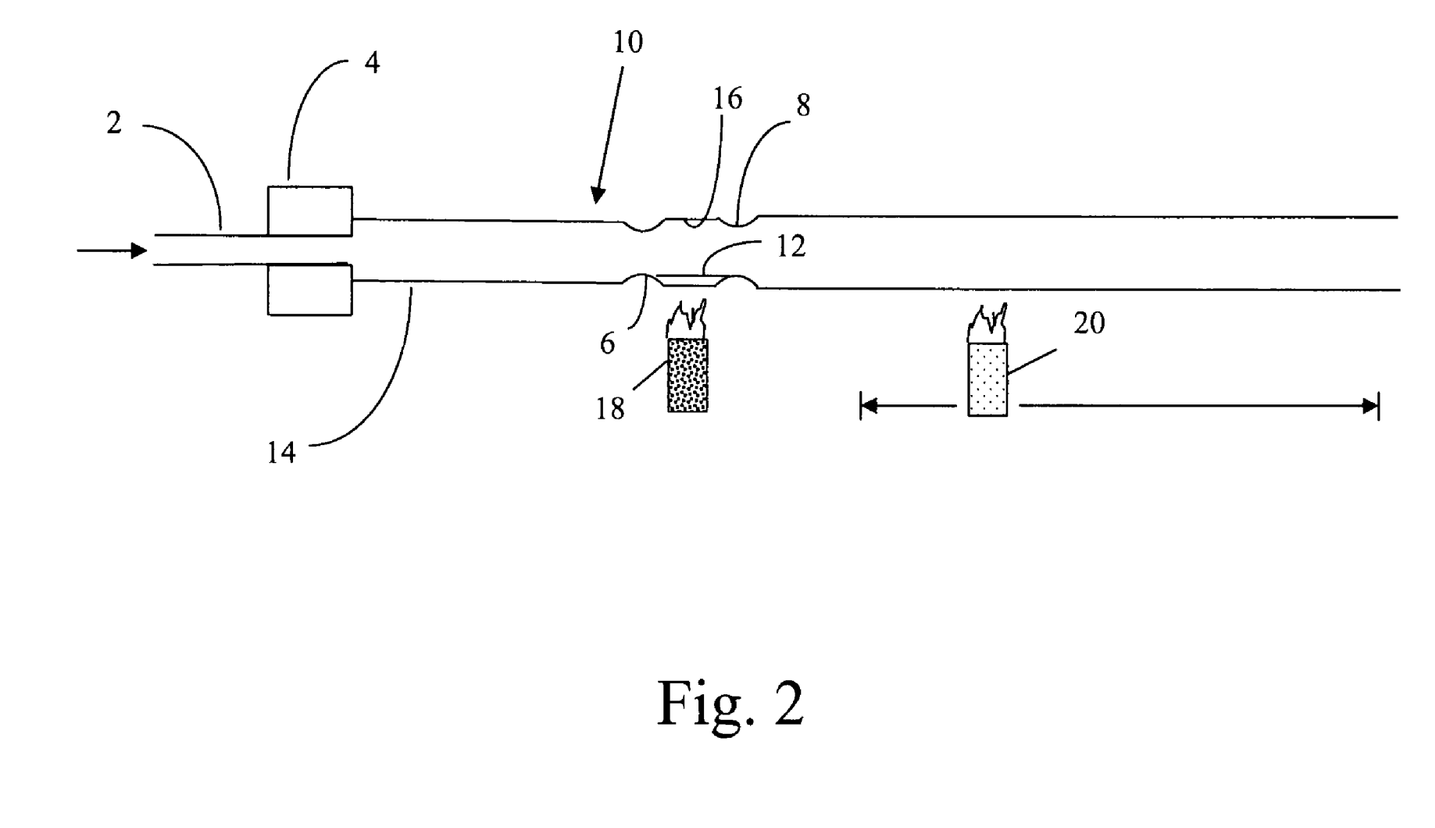
FIG. 2 illustrates an arrangement to diffuse an alkali into a silica glass tube showing the relationship between burner and alkali metal source compound locations.
Figure 3:
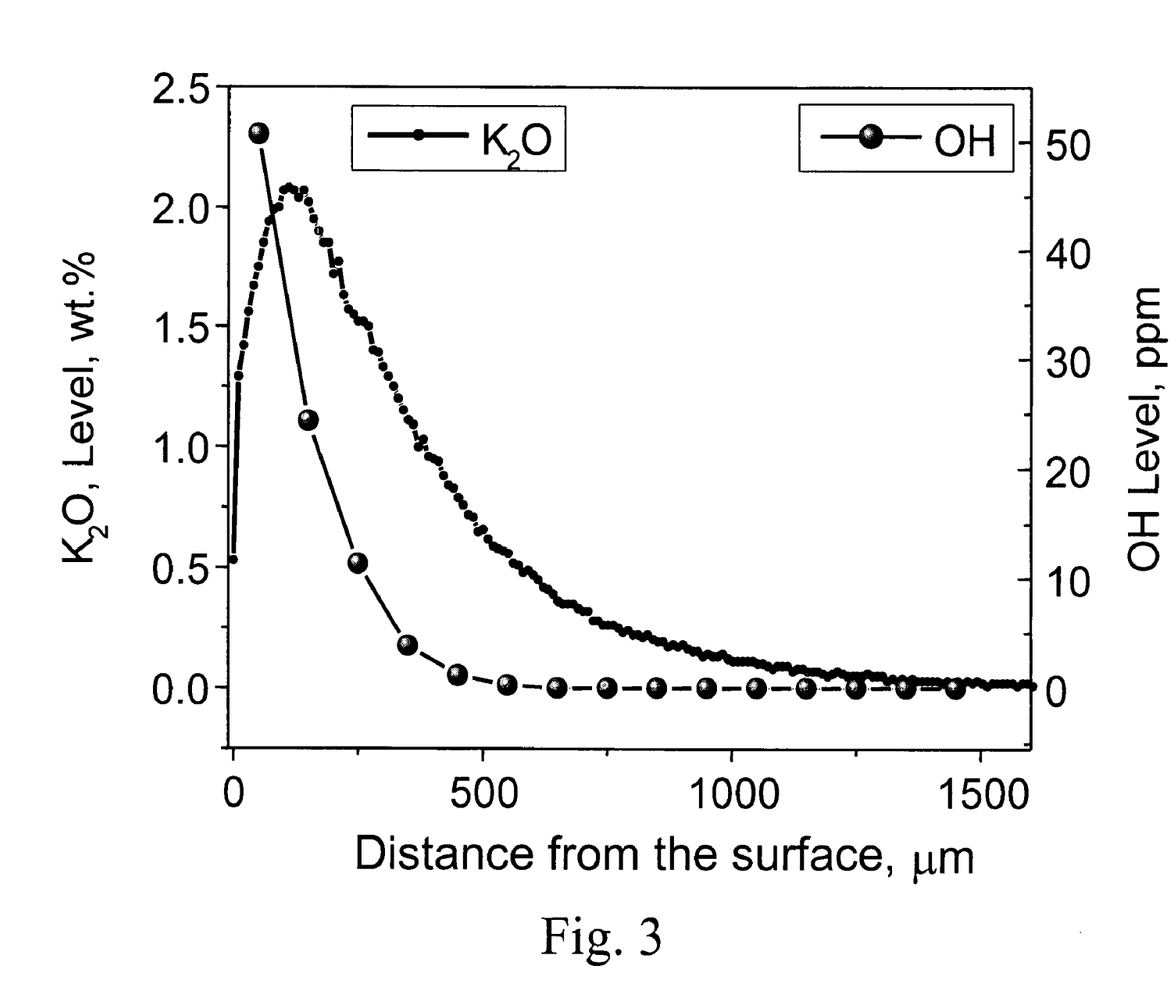
FIG. 3 is a comparison of the diffusion depths for $^-OH$ and K illustrating similar diffusion depths for $^-OH$ and K. The diffusion depth for K was determined by measuring the concentration of $K_2O$.

In one embodiment of the invention, an illustration of which is provided in FIG. 2, a silica glass tube 10 suitable for the manufacture of optical fiber is mounted in a glass-working lathe. One example of an appropriate apparatus is a conventional modified chemical vapor deposition (MCVD) glass-forming lathe. A reservoir 16 for receiving KBr is formed near one end of tube 10 by forging two neck-like deformations, 6 and 8, in the wall of tube 10 about 2 cm from each other. The exact composition of tube 10 is dependent upon the design of the desired optical fiber, however generally such tubes contain as much as, or more than about 80 mole percent $SiO_2$. For the manufacture of many optical fibers tube 10 preferably contains at least about 90 mole percent $SiO_2$. Such tubes may also contain dopants, either singly or in combination. Such dopants may include, for example, F, $Al_2O_3$, CaO, $GeO_2$ or P. Prior to diffusing an alkali metal into tube 10, additional silica glass may be added to the interior surface of glass tube 10 through chemical vapor deposition means. Such additional glass may contain dopants, including, for example, F, $Al_2O_3$, CaO, $GeO_2$ or P. However, for the reasons indicated previously, it is desirable that tube 10, and any additional glass deposited on the inside of tube 10, be essentially chlorine free. By essentially chlorine free we mean exhibiting a chlorine content sufficiently low that optical losses due to alkali chloride crystallization is avoided. We have found that a chlorine content preferably less than about 500 ppm is desired for this purpose. More preferably, the chlorine content is less than about 100 ppm, and most preferably less than about 50 ppm. In addition, silica glass tube 10, and any additional glass deposited therein, should be essentially free of "water". By "water" we mean the hydroxyl group $^-OH$. Water is responsible for an absorption peak at or about 1383 nm, and which absorption peak can extend into the operating wavelength regions of an optical fiber. This peak has a detrimental effect on the fiber attenuation. Therefore it is desirable to reduce the absorption peak, also referred to as the water peak, by reducing the $^-OH$ content of the glass as much as possible. This requires that the starting materials be essentially free of water. By essentially free of water we mean having an $^-OH$ content preferably less than about 100 ppb, and more preferably less than about 20 ppb. By way of example, FIG. 3 illustrates a comparison between the diffusivity of potassium and the diffusivity of $^-OH$ as indicated by the relative depths between the concentrations of $K_2O$ and $^-OH$. As shown, the depth of diffusion for potassium, as determined by measuring the concentration of $K_2O$, is similar to the diffusion depth of $^-OH$ concentration, suggesting that $^-OH$ cannot be removed from the glass by etching from the diffusion surface without substantially affecting the concentration of alkali metal oxide. This further suggests that the most viable means of achieving a low loss optical fiber according to the present invention is to ensure that starting glass articles are essentially free from water prior to diffusing an alkali metal dopant. This can be accomplished, for example, by conventional chlorine drying techniques during manufacture of the silica glass tube, and employing suitable precautions subsequent to its manufacture to prevent rewetting of the tube. The use of chlorine, however, should be minimized to reduce chlorine concentrations in the glass. In the case of porous soot glass articles, drying is preferably accomplished by exposing the article to a fluorine-containing atmosphere, such as, for example, $CF_4$ or $SiF_4$, or combinations thereof, either after chlorine drying or in place of it. The exposure to a fluorine-containing atmosphere is done at temperatures preferably less than about 1100° C. to avoid doping the glass with high levels of fluorine. Preferably, the water content of the glass is less than about 100 ppb, and more preferably less than about 20 ppb.

Referring again to FIG. 2, once the silica glass tube 10 has been prepared, including any deposition of additional glass, an alkali source compound 12 is introduced into tube 10 at reservoir 16 and heated by heat source 18 to form a vapor as tube 10 is rotated. Alkali metal source compound 12 may be introduced into reservoir 16 as a liquid or as a solid. Oxygen is flowed into inlet 2 and into tube 10 through rotating seal 4, and the portion of tube 10 downstream of alkali metal source compound 12 is heated to facilitate diffusion of the alkali metal into the interior surface of tube 10. The portion of tube 10 downstream of alkali metal source compound 12 should be heated to a temperature sufficient to promote rapid diffusion of the alkali and to prevent devitrification. Preferably, the portion of tube 10 downstream of alkali metal source compound 12 is heated by heat source 20 to at least about 1500° C., more preferably at least about 1700° C., and most preferably at least about 2000° C. Alkali metal source compound 12 is a non-chlorine-containing compound having as a constituent an element selected from the group consisting of K, Na, Li, Cs, and Rb. Preferably alkali metal source compound 12 is a bromide or an iodide. More preferably alkali metal source compound 12 is a bromide or an iodide of K or Na. The peak mole percent of alkali diffused into the tube, or any additional glass deposited therein, should be greater than about 0.035%. However, alkali concentrations in excess of about 6 mole percent are typically not advantageous and may present significant processing difficulties. The alkali metal is preferably diffused throughout a depth of at least about 100 microns from the diffusion surface of the tube prior to collapse of the tube, more preferably at least about 300 microns, and most preferably at least about 500 microns.

The diffusion process may be followed by the step of further heating tube 10 to promote a partial collapse of tube 10 to both reduce the inside surface area through which the alkali metal might be lost and to thicken the layer of glass into which the alkali metal has been diffused. Once the diffusion doping step, or any partial collapse of the tube, has been completed, the diffusion surface of the tube is etched with an etchant, suitable for removing silica glass, to a depth sufficient to remove unwanted impurities that may have diffused through the diffusion surface of tube 10. An aqueous HF solution may be used as an etchant. However, this may result in re-wetting of tube 10 and require subsequent drying of the tube. Preferably, a fluoride gas such as, for example, $CF_4$, $SF_6$, $NF_3$, $C_2F_6$ or a mixture thereof, is employed. The amount of material removed is dependent upon processing conditions during diffusion and any partial tube collapse, but the etching conditions are preferably sufficient to result in the removal of glass to a depth of at least about 5 percent of the diffusion depth of the alkali metal. Once etching is finalized, silica glass tube 10 is further heated with heat source 20 to collapse the tube 10 downstream of alkali metal source compound 12 and form a solid glass rod. The solid glass rod is then cut to remove that portion of glass containing reservoir 16. The remaining solid glass rod may constitute an entire optical fiber preform, or it may constitute core cane, i.e. a portion of an optical fiber preform that includes at least a portion of the core, that may be further processed by adding glass material, either through sleeving with a glass tube, through chemical vapor deposition, or through other means, to form an entire optical fiber preform. This additional glass material may constitute core material, cladding material, or both. The completed preform may be drawn into an optical fiber that is capable of exhibiting low optical loss. The optical fiber core made in accordance with the present invention has a peak alkali metal oxide concentration of at least about 0.035 mole percent, a water content less than about 100 ppb and preferably less than about 20 ppb, and has a chlorine content less than about 500 ppm, preferably less than about 100 ppm and most preferably less than about 50 ppm.

Figure 4:
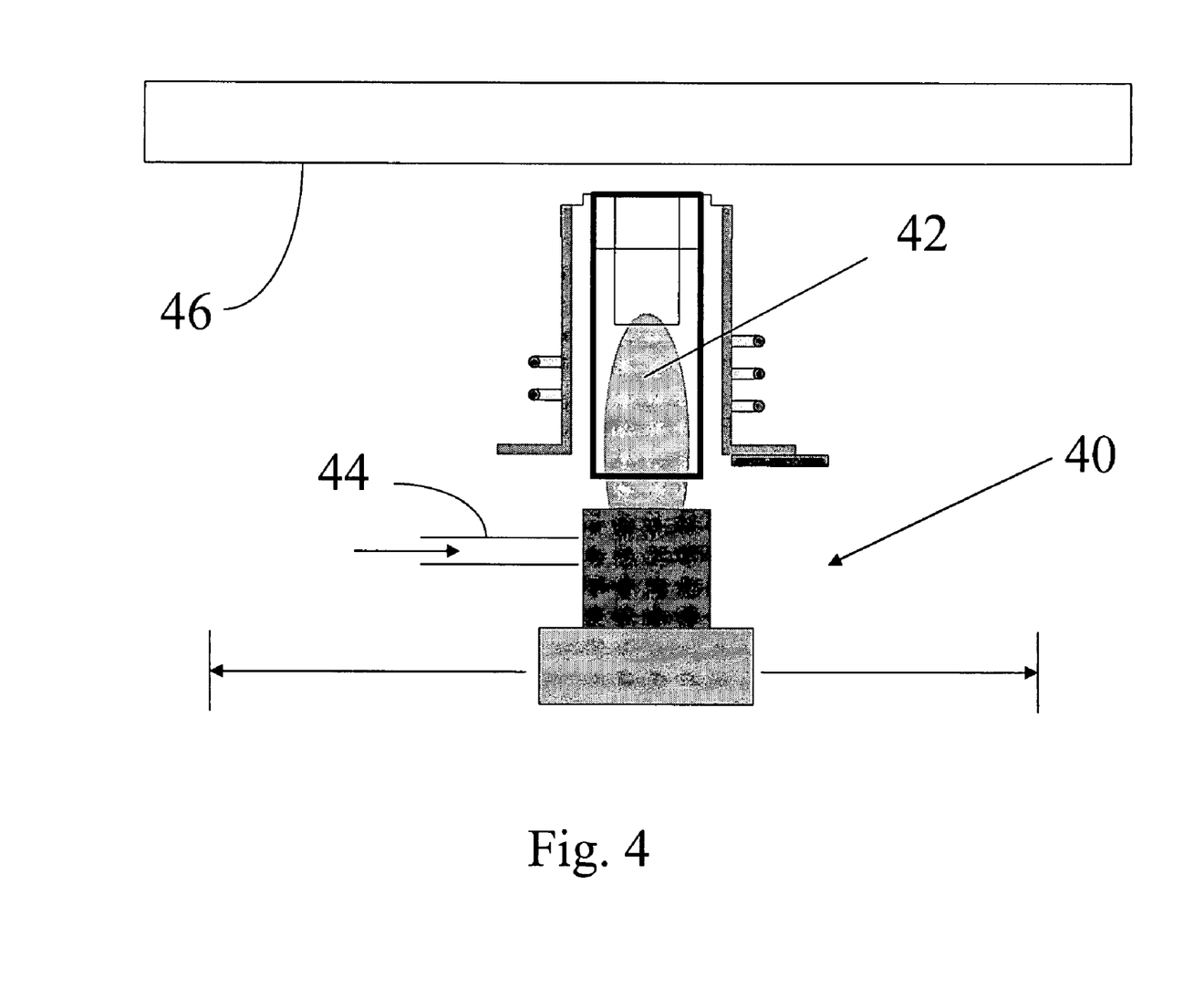
FIG. 4 illustrates an arrangement to diffuse an alkali into a silica glass rod using a plasma burner.

In another embodiment of the invention, shown in FIG. 4, an alkali metal source compound is introduced into heat source 40 through inlet 44 while heat source 40 is traversed over rotating silica glass rod 46. The alkali metal source compound is vaporized in flame 42, and transported to glass rod 46 by flame 42 such that alkali metal is diffused into the outside surface of glass rod 46. The alkali metal is preferably diffused throughout a depth of at least about 100 microns from the diffusion surface of the rod prior to further processing of the rod, more preferably at least about 300 microns, and most preferably at least about 600 microns. The alkali metal source compound may be introduced into heat source 40 as a liquid, as a vapor or as a solid. Preferably the alkali metal source compound is introduced as a liquid. Silica glass rod 46 is essentially free of chlorine and water. Silica glass rod 46 preferably contains at least about 80 mole percent $SiO_2$, with some fiber designs requiring an $SiO_2$ content as high as, or greater than, about 90 mole percent. Because the diffusion surface of glass rod 46 is exposed directly to heat source 40, it is preferable that heat source 40 is dry, wherein by dry we mean the heat source does not contain $H_2$, $^-OH$, or $H_2O$, or produce $H_2$, $^-OH$, or $H_2O$ as a by-product. When carbon monoxide, for example, is used as a fuel and combined in a burner flame with oxygen, the only by-product is carbon dioxide. This carbon dioxide by-product is easily disposed of, and advantageously, no water is formed from the combustion process. Thus, the production of essentially water-free silica soot, preforms and glass is obtainable. As a result, heat source 40 may be, for example, a $CO/O_2$ burner or plasma torch. However, this should not be considered limiting with respect to suitable heat sources. For the purposes of illustration, a plasma torch is depicted as the source for flame 42 in FIG. 4.

When diffusion doping of rod 46 has been completed, the diffusion surface of rod 46 is etched with an etchant, suitable for removing silica glass, to a depth sufficient to remove unwanted impurities that may have diffused through the diffusion surface of rod 46. Preferably the etching step results in the removal of glass to a depth of at least about 5 percent of the diffusion depth of the alkali metal. An aqueous HF solution may, for example, be used as an etchant. However, this may result in re-wetting of glass rod 46 and require subsequent drying of the rod. Preferably, a fluoride gas such as, for example, $CF_4$, $SF_6$, $NF_3$, $C_2F_6$ or a mixture thereof, is employed. The rod may then be further processed by adding glass material, either through sleeving with a glass tube, through chemical vapor deposition, or through other means, to form an entire optical fiber preform. This additional glass material may constitute core material, cladding material, or both. The completed preform may be drawn into an optical fiber capable of exhibiting low loss. The optical fiber core has a peak alkali metal oxide concentration of at least about 0.035 mole percent, a water content preferably less than about 100 ppb and more preferably less than about 20 ppb, and has a chlorine content preferably less than about 500 ppm, more preferably less than about 100 ppm and most preferably less than about 50 ppm.

In a further embodiment of the invention, a silica glass tube 10, as depicted in FIG. 2, is mounted in a conventional MCVD glass-forming lathe. As in either of the previous embodiments silica glass tube 10 preferably contains at least 80 mole percent $SiO_2$, with as much as, or greater than, about 90 mole percent $SiO_2$. Silica glass tube 10 may be doped. Such dopants may include, for example, F, $Al_2O_3$, CaO, $GeO_2$ or P. Preferably, silica glass tube 10 contains less than about 500 ppm chlorine, more preferably less than about 100 ppm and most preferably less than about 50 ppm chlorine. The water content of silica glass tube 10 is preferably less than about 100 ppb, and more preferably less than about 20 ppb. An alkali metal source compound 12 is introduced into tube 10 at reservoir 16 and heated by heat source 18 to form a vapor. Oxygen is flowed into inlet 2 and into tube 10 through rotating seal 4, and the portion of tube 10 downstream of alkali metal source compound 12 is heated by heat source 20 to facilitate diffusion of the alkali metal into the interior surface of tube 10. The alkali metal is preferably diffused throughout a depth of at least about 100 microns from the diffusion surface of the tube prior to collapse of the tube, more preferably at least about 300 microns, and most preferably at least about 500 microns. Once the diffusion doping step has been completed, the diffusion surface of the tube is etched with an etchant, suitable for removing silica glass, to a depth sufficient to remove unwanted impurities that may have diffused through the diffusion surface of tube 10. Preferably the etching step results in the removal of glass to a depth of at least about 5 percent of the diffusion depth of the alkali metal. An aqueous HF solution may be used as an etchant. However, this may result in re-wetting of tube 10 and require subsequent drying of the tube. Preferably, a fluoride gas such as, for example, $CF_4$, $SF_6$, $NF_3$, $C_2F_6$ or a mixture thereof, is employed. After etching is complete, a silica glass rod is inserted into tube 10. Preferably, the silica glass rod contains less than about 100 ppb water, and more preferably less than about 20 ppb. In addition, the chlorine content of the rod is preferably less than about 500 ppm, more preferably less than 100 ppm and most preferably less than about 50 ppm. The silica glass rod preferably contains at least about 80 mole percent $SiO_2$ and for some optical fiber designs the rod should be comprised of as much as, or more than, 90 mole percent $SiO_2$. The silica glass rod may be doped. Such dopants may include, for example, F, $Al_2O_3$, CaO, $GeO_2$ or P. When the silica glass rod has been inserted into tube 10, the assembly of tube 10 and the silica glass rod is then heated by a heat source suitable for collapsing tube 10 onto the silica glass rod to form an optical fiber precursor. The resulting optical fiber precursor may constitute an entire optical fiber preform, or it may be further processed by adding glass material, either through sleeving with a glass tube, through chemical vapor deposition, or through other means, to form a complete optical fiber preform. This additional glass material may constitute core material, cladding material, or both. The completed preform may be drawn into an optical fiber capable of exhibiting low loss. In an alternative to the current embodiment, a silica glass rod 46 may be doped by diffusing an alkali metal into the outer surface of silica glass rod 46 as previously described, and as shown in FIG. 4. The alkali metal is preferably diffused throughout a depth of at least about 100 microns from the diffusion surface of the rod prior to further processing of the rod, more preferably at least about 300 microns, and most preferably at least about 600 microns. As in the preceding description, silica glass rod 46 is essentially free of water and chlorine, with a water content preferably less than about 100 ppb and more preferably less than about 20 ppb. Preferably, the chlorine content silica glass rod 46 is less than about 500 ppm, more preferably less than about 100 ppm and most preferably less than about 50 ppm. As before, rod 46 contains at least about 80 mole percent $SiO_2$, and in some cases, depending upon the design of the optical fiber, as much as, or more than about 90 mole percent $SiO_2$. Silica glass rod 46 may be doped. Such dopants may include, for example, F, $Al_2O_3$, CaO or $GeO_2$ or P. After diffusing the alkali metal into rod 46 in a manner as previously described, the diffusion surface of rod 46 is etched to a depth sufficient to remove diffused impurities, and then rod 46 is inserted into a silica glass tube. Preferably the etching step results in the removal of glass to a depth of at least about 5 percent of the diffusion depth of the alkali metal. The silica glass tube preferably contains at least 80 mole percent $SiO_2$, with as much as, or greater than, about 90 mole percent $SiO_2$. The silica glass tube may be doped. Such dopants may include, for example, F, $Al_2O_3$, CaO, $GeO_2$ or P. Preferably, the silica glass tube contains less than about 500 ppm chlorine, more preferably less than about 100 ppm and most preferably less than about 50 ppm chlorine. The water content of the silica glass tube is preferably less than about 100 ppb, and more preferably less than about 20 ppb. The assembly of the silica glass tube and rod 46 is heated with a heat source suitable to collapse the tube onto rod 46. The rod and tube assembly of either alternative of this embodiment may constitute a complete optical fiber preform, or it may be further processed by adding glass material, either through sleeving with a glass tube, through chemical vapor deposition, or through other means, to form an entire optical fiber preform. This additional glass may constitute core material, cladding material, or both. The completed preform may be drawn into a fiber that is capable of exhibiting low optical loss. The optical fiber core has a peak alkali metal oxide concentration of at least about 0.035 mole percent, a water content less than about 100 ppb and preferably less than about 20 ppb, and has a chlorine content preferably less than about 500 ppm, more preferably less than about 100 ppm, and most preferably less than about 50 ppm.

EXAMPLES

The invention will be further clarified by the following example.

Example 1

Figure 5:
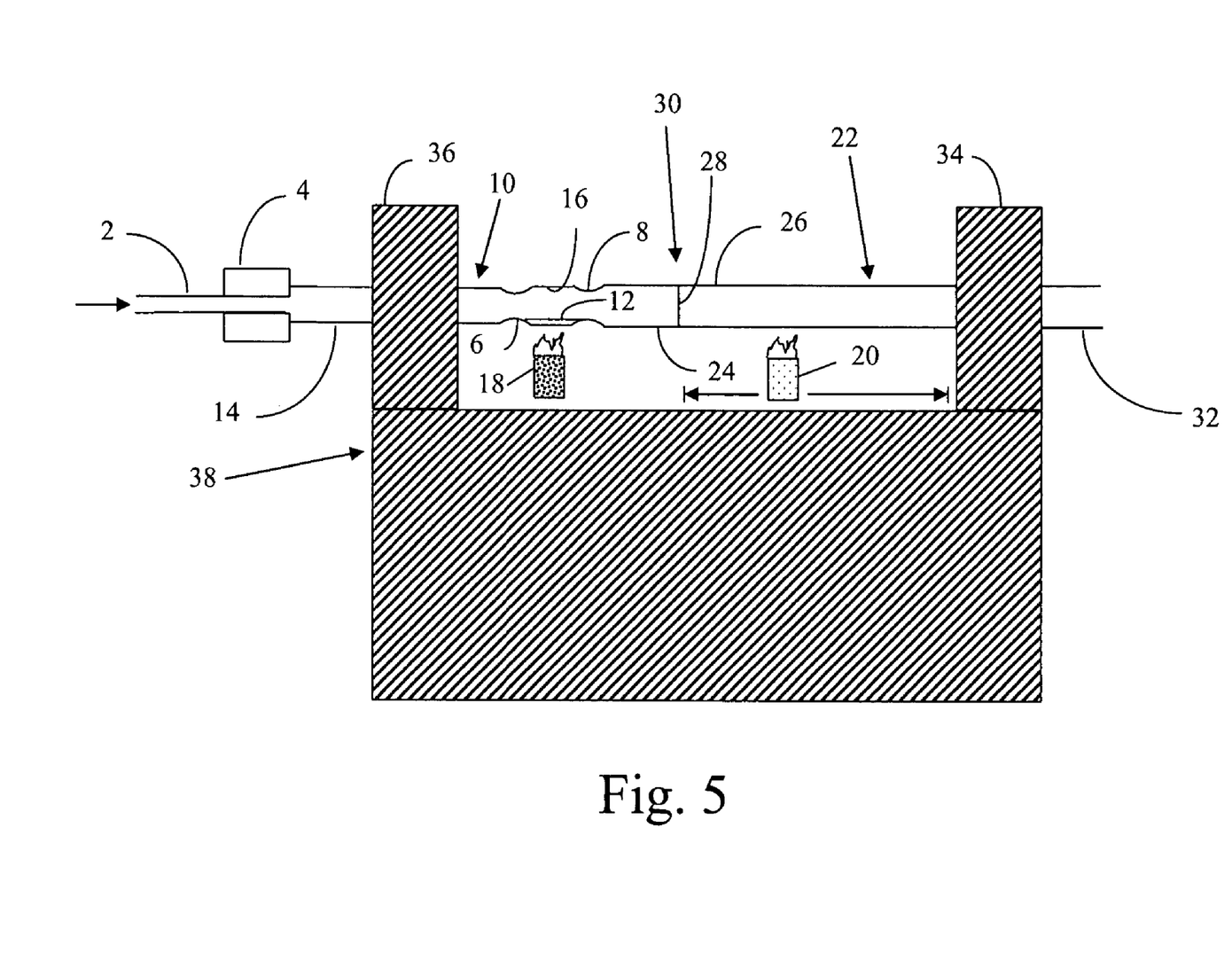
FIG. 5 illustrates a preferred arrangement for diffusing an alkali into a silica glass tube.

Referring to FIG. 5, synthetic silica tube 10 having an inside diameter of 19 mm, an outside diameter of 25 mm and about 0.5 m in length, and containing less than 20 ppm Cl, less than 0.05 weight percent F, less than 10 ppb $^-$OH and that is substantially free of transition metal impurities, is mounted in a conventional MCVD glass forming lathe 38 by chuck 36 and chuck 34 at ends 14 and 24 respectively. Oxygen is flowed into inlet 2 and into tube 10 through rotating seal 4 at 2 l/min and a backpressure of 0.75 Torr while tube 10 is simultaneously fire polished at about 2100° C. A reservoir 16 for receiving KBr is formed near end 24 of tube 10 by forging two neck-like deformations, 6 and 8, in the wall of tube 10 about 2 cm from each other. Deformations 6 and 8 are formed by heating tube 10 to its softening point near end 24 with a hand-held torch while tube 10 rotates and pinching the soft glass with pincers common to the glass-blowing arts. End 24 is removed from its respective chuck 34 in glass-making lathe 38 and a quantity of KBr 12 is positioned inside reservoir 16. End 24 of tube 10 is then remounted in chuck 34 and reservoir 16 is heated to about 1000° C. by heat source 18, external to tube 10 and located at reservoir 16, while dry nitrogen is flowed into inlet 2 and tube 10 is rotated. The KBr 12 melts and is dehydrated. Tube 10 is then cooled and end 24 is removed from chuck 34. A second silica glass tube 22, having the same characteristics with respect to size, water content and chlorine content as tube 10, and having been fire polished in a manner similar to tube 10, is placed in chuck 34 at end 32, and the free end 26 of tube 22 is brought into contact with the free end 24 of tube 10 at interface 28. Dry nitrogen is flowed into inlet 2 and into tube 10 through rotating seal 4, during which time end 24 of tube 10 is welded to end 26 of tube 22 at interface 28 to form a composite tube 30 using a hand-held torch. Composite tube 30 is then rotated continuously and heat source 18 heats reservoir 16 to produce KBr vapor. Oxygen is flowed into inlet 2 and into composite tube 30 through rotating joint 4, over the reservoir of liquid KBr 12, and through composite tube 30 to transport the KBr vapor through composite tube 30. Simultaneously, heat source 20 is traversed over composite tube 30 downstream of reservoir 16, heating the portion of composite tube 30 downstream of reservoir 16 to about 2100° C. During this phase, KBr vapor comes in contact with the inside surface of composite tube 30 and alkali metal diffuses into the glass through the interior wall of composite tube 30. Heat source 20 is traversed a sufficient number of times to achieve an alkali metal oxide depth of about 300 um and a peak alkali metal oxide concentration of at least 0.035 mole percent in the interior region of composite tube 30.

The portion of composite tube 30 downstream of reservoir 16 is next heated and partially collapsed to a bore diameter of about 2 mm, after which the centerline is etched to remove glass to a depth of about 5% of the diffusion depth of the potassium by flowing a mixture of $C_2F_6$ and oxygen into inlet 2 and through composite tube 30 at a temperature of about 2100° C. and a back pressure of 0.57 Torr.

Following the etching step, composite tube 30 is further collapsed, using conventional techniques, into a solid glass rod. The solid glass rod is then cut downstream of interface 28 to form a core cane from that portion of solid glass rod downstream of the cut. The resulting core cane shows no sign of crystallization and has a peak $K_2O$ concentration of at least about 0.035 mole percent. The core cane may be further processed by etching the outer surface to remove impurities picked up from heat source 20 and the outside environment. The core cane is then placed inside a synthetic silica tube manufactured by an outside vapor deposition process and which tube contains less than 20 ppm Cl, less than 10 ppb $^-$OH, and approximately 1.2 wt. % F. The core cane and tube assembly is purified and the tube collapsed onto the core cane in a dry furnace, and then the assembly is further sleeved with a F-doped silica tube and drawn into a fiber that has an optical loss less than that of an otherwise identical fiber that is essentially alkali-free.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical fiber wherein the core is comprised of $SiO_2$ and an alkali metal oxide of the form $X_2O$ where X is selected from the group consisting of K, Na, Li, Cs and Rb and $0.035 \leq X_2O \leq 6$ mole percent, wherein said core is further comprised of less than about 100 ppm chlorine and less than about 100 ppb $^-$OH, and wherein an optical attenuation of the optical fiber at a wavelength of 1550 nm is less than 0.18 dB/km.

2. The optical fiber of claim 1 wherein said core is comprised of less than about 50 ppm Cl.

3. The optical fiber of claim 1 wherein said core of said optical fiber is comprised of less than about 20 ppb $^-$OH.

4. An optical fiber, comprising:
   $SiO_2$ and an alkali metal oxide in the form of $X_2O$ where X is selected from a group consisting of K, Na, Li, Cs and Rb, and $GeO_2$; and
   wherein an optical attenuation at 1550 nm is less than 0.18 dB/km.

5. The optical fiber according to claim 4 wherein the alkali metal oxide and the $GeO_2$ are present in a core of the optical fiber.

6. The optical fiber according to claim 5 wherein a chlorine content in the core is less than 500 ppm.

7. The optical fiber according to claim 6 wherein a chlorine content in the core is less than 100 ppm.

8. The optical fiber according to claim 7 wherein a chlorine content in the core is less than 50 ppm.

9. The optical fiber according to claim 6 wherein a water content in the core is less than 100 ppb.

10. The optical fiber according to claim 9 wherein the water content in the core is less than 20 ppb.

11. An optical fiber, comprising:
   a core comprising $SiO_2$ and an alkali metal oxide in the form of $X_2O$ and $GeO_2$, where X is selected from a group consisting of K, Na, Li, Cs and Rb; and
   wherein an optical attenuation at 1550 nm of the optical fiber is less than about 0.18 dB/km.

* * * * *